United States Patent [19]

Gaus et al.

[11] 4,132,935
[45] Jan. 2, 1979

[54] PHONOGRAPH TURNTABLE CONTROL SYSTEM

[75] Inventors: Harry Gaus, Kronberg; Jeffrey Johnson, Wiesbaden-Hessloch; Udo Milutziki, Walldorf; Dietwald Schotte, Eschborn, all of Fed. Rep. of Germany

[73] Assignee: Braun Aktiengesellschaft, Frankfurt am Main, Fed. Rep. of Germany

[21] Appl. No.: 835,535

[22] Filed: Sep. 22, 1977

[30] Foreign Application Priority Data

Sep. 23, 1976 [DE] Fed. Rep. of Germany ....... 2642726

[51] Int. Cl.² .............................................. H02P 5/06
[52] U.S. Cl. .................................... 318/480; 318/446; 274/15 R
[58] Field of Search ................. 318/480, 446, 466, 51; 274/1 E, 1 C, 1 R, 15 R, 39 A, 9 RA

[56] References Cited

U.S. PATENT DOCUMENTS

| 3,525,028 | 8/1970 | Ruoss et al. | 318/446 |
| 3,662,363 | 5/1972 | Chertok | 274/9 RA |
| 3,993,315 | 11/1976 | Hansen et al. | 274/39 A |
| 4,027,217 | 5/1977 | Harman | 318/480 |
| 4,085,940 | 4/1978 | Hoshimi | 274/15 R |

Primary Examiner—B. Dobeck
Attorney, Agent, or Firm—Michael J. Striker

[57] ABSTRACT

When the user presses a touch-activated switch a first time, a first digital storage device becomes set and furnishes a platter-motor-start signal to the control electronics of the platter drive motor. If the touch-activated switch is pressed a second time, the first digital storage device becomes reset, and the signal commanding that the platter drive motor operate terminates. A second digital storage device likewise assumes its set and reset states in response to the first and second pressing of the touch-activated switch. Sensors ascertain various operating conditions during the course of turntable operation, such as the swinging of the tone arm to the position corresponding to the lead-in groove of a phonograph record. The states of the digital storage devices are additionally dependent upon the conditions sensed by the sensors. Logic circuitry interprets the combinations of states of the digital storage devices and causes the requisite turntable operations to be performed, e.g., lifting and lowering of the tone arm, inward and outward swinging of the tone arm, initiation and termination of rotation of the platter, audio muting, and the like.

1 Claim, 7 Drawing Figures

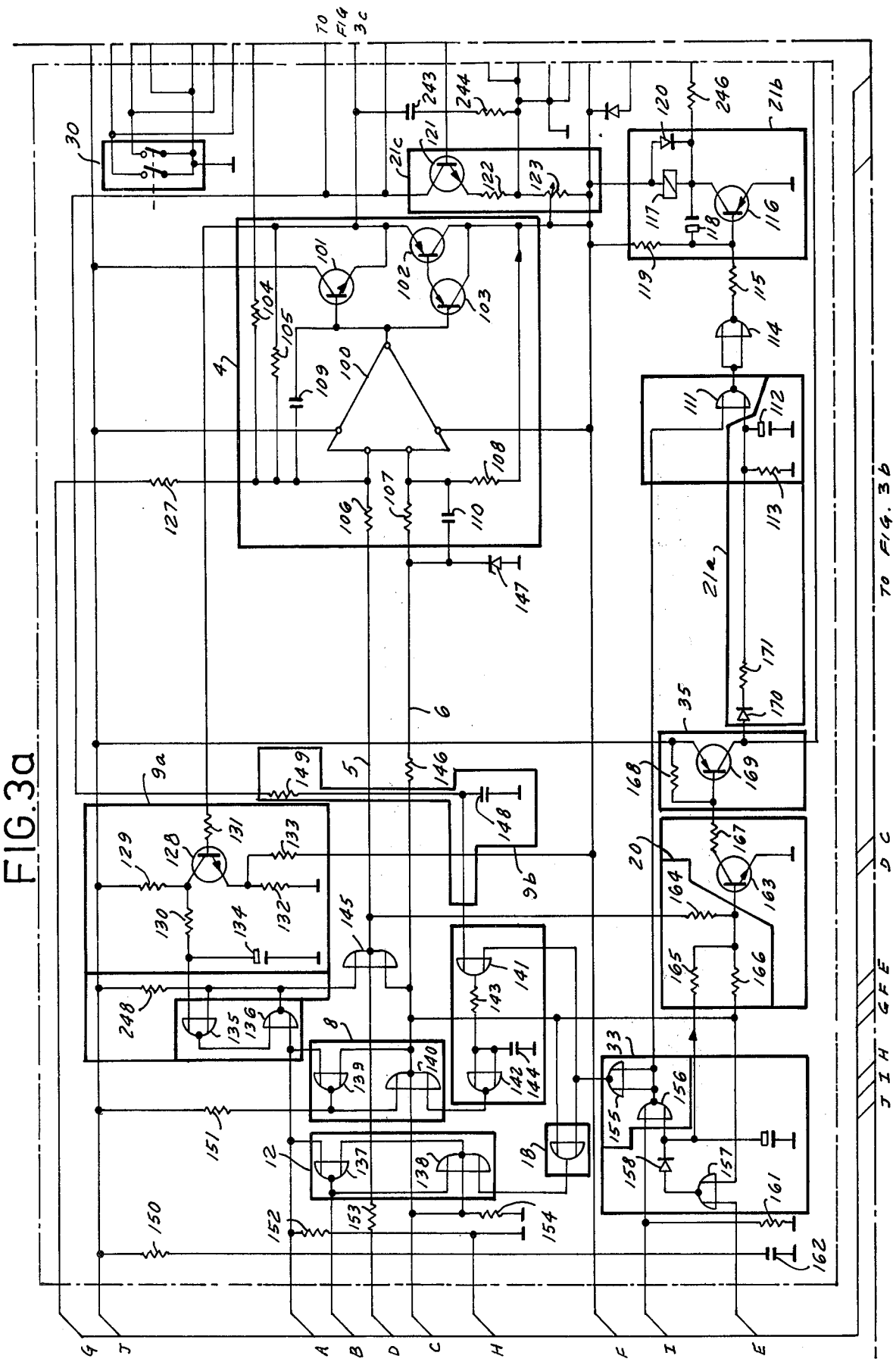

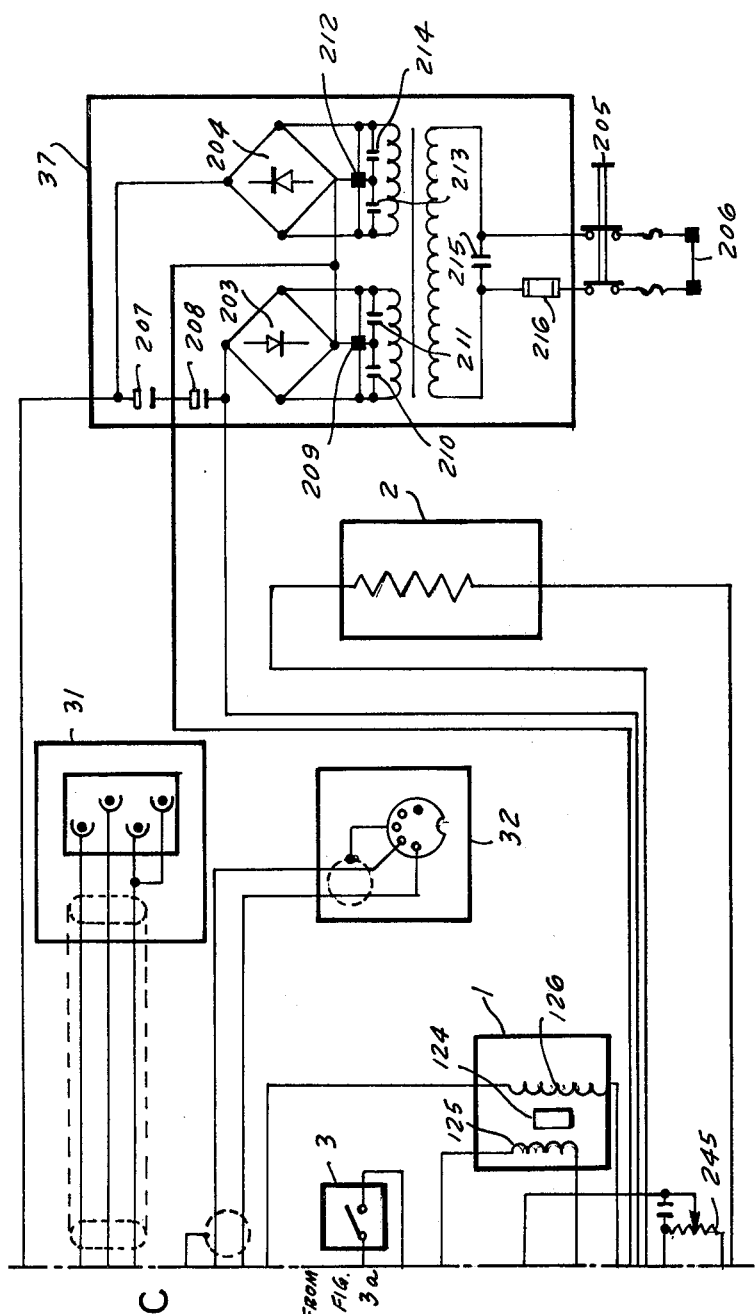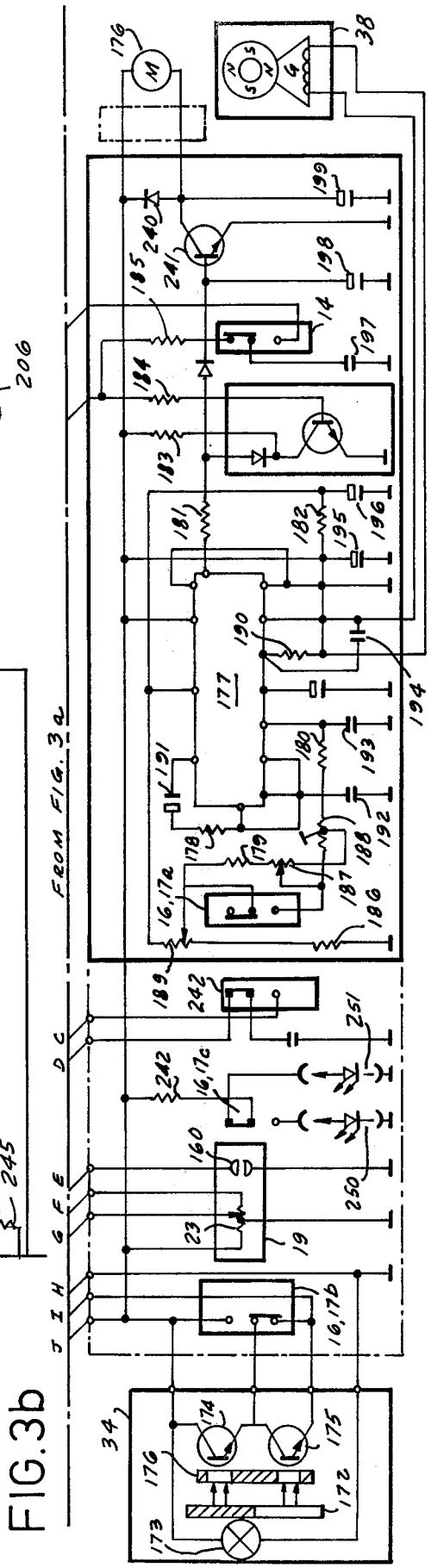
FIG.3c
FIG.3b

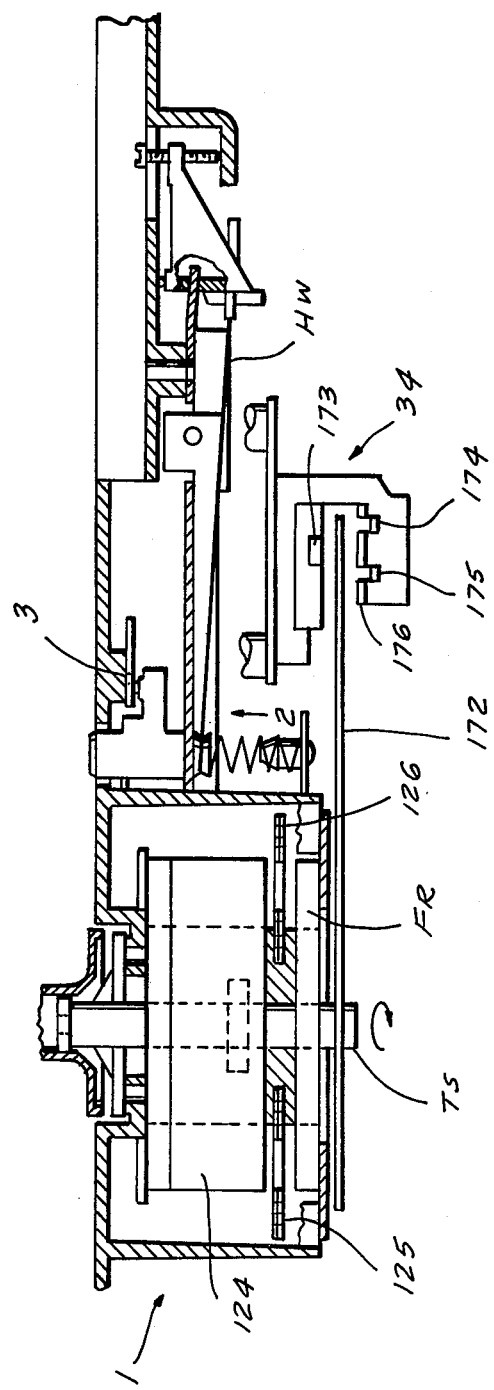

PHONOGRAPH TURNTABLE CONTROL SYSTEM

BACKGROUND OF THE INVENTION

The invention concerns a phonograph turntable control system, provided with means for lifting and lowering the tone arm, means for swinging the tone arm horizontally, means for detecting when the tone arm has been lowered onto a record and when the tone arm has reached the end of a record, and provided with touch-activated switches or touch buttons activated by the user, with settable and resettable electrical or electronic storage devices which register commands for the swinging, lifting and lowering of the tone arm and for turning on and off the drive motor for the platter.

In conventional phonographs, the control functions for the platter motor and the tone arm are implemented using predominantly mechanical means. Use is typically made of transmissions, gearing, levers, and the like. However, mechanical components such as these wear and age quite rapidly and are very susceptible to malfunction.

For certain special functions, it has already been proposed to make use of nonmechanical control devices which make for a considerable improvement in overall phonograph turntable construction. For example, German Pat. DT-PS No. 1,243,412 discloses a shutoff system for the platter drive motor of a phonograph turntable. The tone arm has connected to it a light shield which, when the tone arm swings, moves through the light path of a photoelectric detector. The speed of swinging movement of the tone arm is sensed, and when a certain speed of swinging movement is reached, the platter drive motor is shut off by means of a transistor-controlled switching relay. An RC-circuit receives the output signal of the photodetector and produces a voltage whose magnitude is dependent upon the rate of change of the light-dependent current produced by the photodetector.

German published patent application DT-OS No. 1,810,983 discloses another photoelectric switching system for phonograph turntables. The photoelectric switching system includes a stationary light source and a stationary light detector. A deflecting mirror is mechanically coupled to the tone arm and moves as the tone arm becomes inwardly displaced during tracking of the spiral record groove. The deflecting mirror is preferably oriented perpendicular to a radial plane which passes through the swinging axis of the tone arm. When the tone arm reaches a position calling for the initiation of a switching operation, the deflecting mirror directs the light from the light source onto the light detector.

Other automatic switching devices are known in the art, for switching off a phonograph at the end of a record, for lowering the tone arm and for controlling the tone-arm drive mechanism, for example in German published patent applications Nos. DT-OS 19 57 562, DS-OS 20 54 880, DT-OS 20 11 005 and DT-OS 19 54 673, and also in German allowed patent application No. DT-AS 19 17 241. However, these various automatic switching systems relate to various individual aspects of electronic phonographic control.

The Audiodynamics Corporation (ADC Accutrac 4000, brochure AVO 17608) produces an automatic phonograph turntable in which various functions can be triggered by pushbutton action or by wireless remote control. However, this known system is not provided with sensor operator control elements.

Finally, German published patent application No. DT-OS 21 04 692 discloses a system in which the various functions to be performed for turntable control are made to have a much more automatic character, and are implemented using electronic means. The tone arm is moved by two electromechanical positioning devices, one for horizontal swinging of the tone arm, the other for vertical lifting and lowering of the tone arm. Use is made of two electrical storage devices for storage of swing-in and swing-out information. The tone arm is lifted as soon as one of the storage devices registers a signal. Swinging of the tone arm is not possible until after the lifting movement of the tone arm has been completed. The storage devices are erased when tone-arm-position transducers signal the end of the operation involved. The use of settable storage devices makes it possible to dispense with the use of electrical switches of the type which must be held locked in activated position by mechanical locking means; instead, use can be made of touch-activated switches, very-low-force touch buttons, and the like.

The present invention proceeds from the state of the prior art last referred to.

SUMMARY OF THE INVENTION

It is a general object of the invention to provide a turntable control system which uses electronic components to control the lifting, lowering and swinging of the tone arm, and in which manual initiation of automatic operations can be performed using simple touch-activated switches, momentary switches activated by very-light-pressure touch-button action, and the like, so that manual initiation of automatic operations can be performed with very great ease and using a minimum of manual force.

These objects can be met, in the preferred embodiment of the invention, using first and second electronic digital storage devices. When the user presses a touch-activated switch a first time, the first digital storage device becomes set and furnishes a platter-motor-start signal to the control electronics of the platter drive motor. If the touch-activated switch is pressed a second time, the first digital storage device becomes reset, and the signal commanding that the platter drive motor operate terminates. A second digital storage device likewise assumes its set and reset states in response to the first and second pressing of the touch-activated switch. Sensors ascertain various operating conditions during the course of turntable operation, such as the swinging of the tone arm to the position corresponding to the lead-in groove of a phonograph record, etc. The states of the digital storage devices are additionally dependent upon the conditions sensed by the sensors. Logic circuitry interprets the combinations of states of the digital storage devices and causes the requisite turntable operations to be performed, e.g., lifting and lowering of the tone arm, inward and outward swinging of the tone arm, initiation and termination of rotation of the platter, audio muting, and the like.

With the inventive system, incorrect manual initiation of automatically performed operations becomes almost impossible. Also, with the inventive concepts, it becomes possible to combine an automatic touch system with a searching function.

The novel features which are considered as characteristic for the invention are set forth in particular in the appended claims. The invention itself, however, both as to its construction and its method of operation, together with additional objects and advantages therof, will be best understood from the following description of specific embodiments when read in connection with the accompanying drawings.

BRIEF DESCRIPTION OF THE DRAWINGS

FIGS. 3a to 3c together form the circuit diagram of an exemplary circuit for the embodiment of FIG. 1; and FIGS. 4a and 4b depict mechanical aspects of the swing unit and the lift unit for the tone arm of the turntable.

DESCRIPTION OF THE PREFERRED EMBODIMENTS

Figure 1:
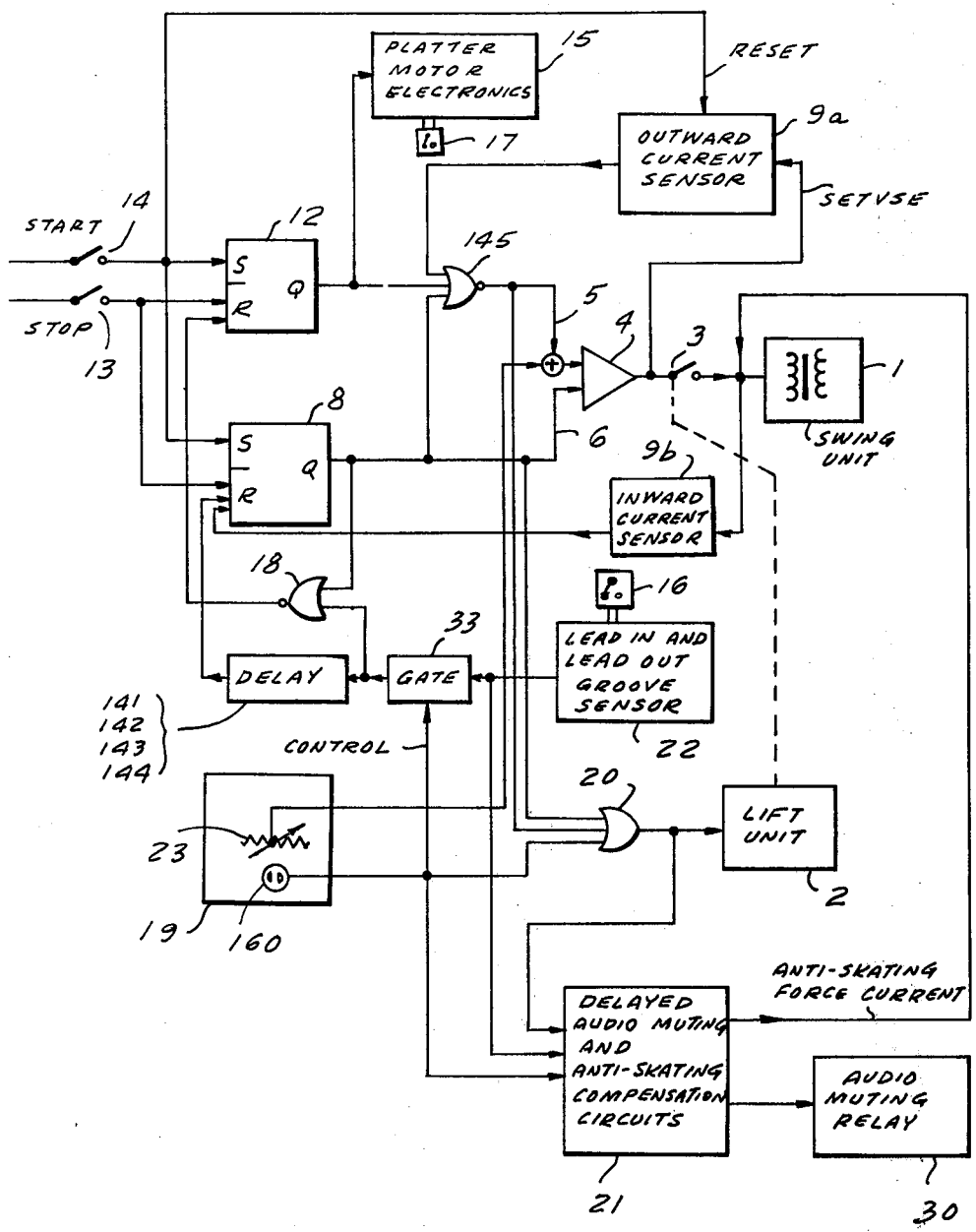
FIG. 1 is a schematic block diagram of a first embodiment of the invention.

The exemplary turntable depicted in FIG. 1 comprises a tone-arm swing unit 1 driven by a control amplifier 4 over a switch 3; a control system for providing appropriate signals to said amplifier 4; a lift device 2 for raising the tone arm or allowing it to drop; a drive system 15 for the platter, comprised of a motor and associated electronics of such a nature that starting and stopping of the motor, and the speed of the motor, may be controlled by purely electrical means; and certain subsystems, namely means for detecting the position of the tone arm and producing a certain electrical signal corresponding thereto, shown as 22 in FIG. 1; means for sensing overcurrent conditions in the drive coil of 1, which overcurrent sensor is denoted by 9a and 9b; means for controlling the raising and lowering of the tone arm and its angular position in response to a manual control device 19; means for providing electrically a suitable anti-skating compensation force, and means for muting the audio output at desired times, generally at all times except for the normal playing mode, these being encompassed by a subsystem 21, in combination with a muting device 30.

The control circuit includes two bistable storage devices, hereafter referred to as flip-flops, but which are not restricted to the means customarily associated with the designation "flip-flop." The operation of the turntable is related to the state of said flip-flops, which state may be established or changed in response to external commands introduced by the user, and/or by certain signals generated internally by subsections of the turntable. Each flip-flop consists of an output, designated Q; an input designated S which causes the output to assume an active or logically high condition; and a plurality of inputs designated R which singly or in combination cause the output to assume an inactive or logically low state.

The outputs of the two flip-flops 8, 12 may together represent a maximum of four distinct and distinguishable states. These distinct states, or some of them, are used to control the operation of the turntable by a suitable arrangement of logic elements connecting said flip-flops to the several parts of the turntable mechanism. A means is provided whereby a certain desired state of the outputs of the flip-flops exists following the application of supply voltage to the circuitry but prior to the entrance by the user of any operative commands.

Provision is made for the user to initiate commands to the control system for purposes of automatic operation, which are of two kinds. The first is the START command, which initiates the playing of a record. The second is the STOP command which discontinues the playing of a record and returns the tone arm to its rest and stops platter rotation. These commands may be introduced by a variety of means, including but not necessarily limited to, the use of pushbuttons or other switching means; in general, any means which is capable of producing suitable voltage pulses at the appropriate flip-flop inputs and which are designated symbolically in FIG. 1 by switches 14 and 13 for START and STOP respectively. Such commands may also be introduced in conjunction with electronic control of platter rotational speed as will be discussed in connection with FIG. 2. Furthermore, such START and STOP signals may be produced by the repeated actuation of one button by the provision of a toggling or alternate-action means.

The START signal is introduced into the S input of first flip-flop 12, and into the S input of a second flip-flop 8, which in each case results in the output of the respective flip-flop assuming an active or high state. The STOP signal is introduced into one R input of first flip-flop 12, and also into one R input of second flip-flop 8, causing the outputs of both flip-flops to assume an inactive or low state. Thus, START and STOP signals result in distinct output states of flip-flops 12 and 8. Additional distinct states of such flip-flop outputs result from introducing certain reset signals in a particular manner as will be described.

The turntable is required to perform at least the following distinct operating functions: (1) a START function, in which the tone arm is lifted and caused to swing inward until a certain desired radial position over the platter is reached, which position corresponds to the lead-in groove of the record and which may if desired be made selectable by the user to accommodate various record diameters. During this START function the platter may be caused to rotate. A second function (2) is a playing function in which the arm is lowered, and the platter is caused to rotate. A third function (3) is the STOP function in which platter rotation ceases, the arm is lifted and caused to swing outward. Such STOP function may be selected by the user by means of 13 or a subsystem performing the function of switch 13; or, alternatively, the STOP function may be initiated by the sensing of the arm position in such a manner as to indicate when the arm has reached the run-out groove area of the record, which position may be made selectable by the user to accommodate various record diameters. A fourth "stand-by" function is provided in which outward movement of the arm ceases and the arm is allowed to sink downward, the platter remaining stationary.

Certain desirable additional functions are accomplished in connection with the four conditions enumerated above. These are (1) an audio muting function, and (2) an anti-skating compensation function. The audio muting function is so arranged that no audio output results from the turntable during START, STOP, and "stand-by" operating modes; and furthermore, that at the beginning of playing mode operation a time delay is provided to avoid the transmission of stylus set-down noise to the reproducing system. An electronic anti-skating compensation means is provided whereby a constant current of magnitude and polarity such as to cause swing unit 1 to develop a rotational force to oppose the skating force developed during the playing of a record is supplied to swing unit drive coil 125 (shown in FIG. 2). This current may be adjusted in magnitude by control 245 (discussed later with respect to FIG. 3) which is accessible to the user, resulting in an anti-skating force suited to particular circumstances of use. Such anti-skating compensation is applied only during play mode, and is subject to time delay at the beginning of play mode to preclude such compensating force from moving the arm angularly and thereby failing to set down at the desired location on the record.

The manner in which these operating mode functions are performed will now be described. A START command causes the respective outputs of flip-flops 12, 8 to become high. This condition is decoded, for example by the use of NOR-gate 145 in FIG. 1, such that a signal 6 is applied to an input of drive amplifier 4 and also to an input of OR-gate 20. The output of OR-gate 20 causes arm lift 2 to be energized and the arm to lift, which lifting also closes switch 3, switch 3 being mechanically coupled to the arm lift mechanism, whereby drive coil 125 (shown in FIG. 3) of swing unit 1 is connected to amplifier 4. The input to which signal 6 is applied is such as to cause a resulting inward angular motion of the tone arm. NOR-gate 145 is provided with a high signal from flip-flop 12 causing the output of gate 145 to be low, and consequently signal 5 is zero.

Upon reaching a preselected point, position sensor sybsystem 22 delivers an output signal which is transmitted through gate 33 and time delay 141, 142, 143, 144 (shown in detail in FIG. 3) to one reset input of flip-flop 8. By this means, flip-flop 8 is caused to reset and its output becomes low. Signal 6 therefore becomes zero and arm motion ceases since amplifier 4 receives no input signals. The low state of flip-flop 8 also removes the activating signal from lift 2 which had been transmitted through OR-gate 20. The arm is thereby lowered onto the record. The completion of this process results in the attainment of normal playing mode operation. During normal playing mode, there remains an output signal from position sensor 22. Removal of a signal from lift 2, as just described, also removes a signal from the muting and anti-skating sybsystem 21. The removal of such signals results, after a time delay, in the actuation of means to permit transmission of the audio signal of an anti-skating compensation current, after the time delay has elapsed, to the drive coil of swing unit 1.

When the arm has attained the position corresponding to the lead-out groove of the record, the signal from position sensor 22 becomes zero. The output of flip-flop 8 has been made zero previously as described above. Consequently, zero output from position sensor 22 is communicated to NOR-gate 18 via transmission gate 33. The output of NOR-gate 18 is then caused to be high, which high state output is applied to one reset input of flip-flop 12, causing the output state of this flip-flop to become low. The respective outputs of the two flip-flops 12 and 8 are now low. The output of outward current sensor 9a is also low, and the application of low state signals to every input of NOR-gate 145 causes its output to become high. This output is applied as signal 5 to amplifier 4 and also to one input of OR-gate 20. The input of amplifier 4 to which signal 5 is applied is such as to result in outward motion of the tone arm. The presence of a high signal at one input of OR-gate 20 causes the lift 2 to be activated as previously described. The arm is then lifted, upon completion of which switch 3 is closed, and a drive signal from amplifier 4 is applied to drive coil 125 of swing unit 1 such as to move the arm outward. This state of the circuit corresponds to stop mode. The STOP mode may also be caused to exist by the user at any time during normal playing mode operation by the user causing a STOP command to be introduced via switch 13 or an equivalent means. Such a command is communicated to one reset input of flip-flop 12, and also to one reset input of flip-flop 8. This causes the respective outputs of both flip-flops to become low and the stop function procedure previously described takes place.

The function of delay circuit 141, 142, 143, 144 is to prevent an improper sequence of flip-flop reset operations, by preventing the transmission of a signal to one reset input of flip-flop 8, until NOR-gate 18 has assumed a steady-state condition of low state output resulting from the presence of one or more high state inputs to NOR-gate 18. The function of transmission gate 33 will be explained below.

An overcurrent sensor sybsystem 9 is also provided, consisting of outward current sense circuit 9a and inward current sense circuit 9b, the designation "outward" and "inward" corresponding to the polarity of current through the drive coil 125 and/or the voltage existing at the output of amplifier 4 under conditions of outward and inward arm movement respectively. The overcurrent sensors detect and respond to the elevated currents and/or the corresponding elevated voltage drops which obtain when motion of the arm is mechanically hindered and one or the other inputs of amplifier 4 is supplied with a high state signal. The outward overcurrent sensor 9a is of such a nature that if the input to the overcurrent sensor 9a exceeds a predetermined threshold value for a certain length of time, the output of sensor circuit 9a will assume a high state, and will furthermore remain in such high state until its reset input is activated. Such an overcurrent sensor as described may be implemented by means of a suitable threshold-responsive circuit, followed by an integrator, followed by a suitable bistable storage device such as a flip-flop or other resettable bistable storage. An alternate arrangement could consist of an integrator, followed by a threshold detector, followed by the aforementioned suitable bistable storage device. A third possible arrangement might utilize an integrator followed by a bistable storage device of such a nature that a threshold effect is inherently present in the set input of such storage device.

At the completion of play of a record, or following the initiation by the user of the STOP function, the state of the circuit is as previously described as STOP mode. In such a case, the arm will be subject to an outward-going force from swing unit 1 for an indefinite time. A mechanical stop or other hinderance is, however, provided in such a way that the motion of the arm is mechanically hindered from further outward motion when the arm is located over the arm rest. The overcurrent situation thereby existing due to such hinderance will be sensed by outward current sensor 9a, and the output of sensor 9a will become high after a period of time. The high output of current sensor 9a is applied to one input of NOR-gate 145, causing the output of NOR-gate 145 to become low. The output of NOR-gate 145 corresponds to the signal 6, which consequently becomes zero. In this case, no signals are applied to amplifier 4 and rotational force ceases to be applied to the arm via swing unit 1. Also, the signal applied from the output of NOR-gate 145 to one input of OR-gate 20 is zero, and the output of OR-gate 20 becomes low, removing the lift signal from lift 2, thereby causing the arm to drop. This state of the circuit corresponds to the "stand-by" condition.

The outward current sensor 9a has also a reset input which is connected to the junction of the START switch 14 or its equivalent, the set input of flip-flop 12, and the set input of flip-flop 8. By this means, the output of current sensor 9a is caused to be in a low state whenever a START command is introduced into the turntable. Furthermore, the bistable storge element contained in 9a as previously described, is so arranged that the output of such storage device is low following the application of supply power to the circuitry.

Should the arm be mechanically hindered at any time during a condition of outward motion, the series of events previously described will take place and the stand-by condition will obtain. By this means, possible damage to the arm and/or parts of the control system is avoided.

In an analogous manner, hinderance of the motion of the arm under conditions of inward motion will cause the output of the inward current sensor to become high. The inward current sensor consists of an integrator and a following threshold circuit. Alternately, a threshold circuit followed by an integrator could be employed. Also, the function of threshold detection could be performed by subsequent circuitry if such subsequent circuitry exhibits a suitable threshold characteristic in its operation. The existence of a high state of the inward current sensor 9b output, which output is connected to one reset input of flip-flop 8, causes flip-flop 8 to be reset. One input of NOR-GATE 18 is connected to the output of flip-flop 8. Inward motion condition exists only when the arm is located between the arm rest and the beginning of a record; therefore, the output of position sensor 22 is low. This low state is transmitted through transmission gate 33 to the other input of NOR-gate 18, causing the output of NOR-gate 18 to become high. This high signal is transmitted to one reset input of flip-flop 12, thus resetting said flip-flop. Both flip-flops are now reset, constituting the STOP condition.

It is desirable that the rotation of the platter be automatically controlled. This is accomplished by connecting the output of flip-flop 12 to the platter electronics 15. The output of flip-flop 12 is high only under conditions of (1) START and (2) normal playing condition. A suitable circuit means is provided in platter electronics 15 such that a high state signal at said input causes the platter drive motor to be activated, and the motor not to be activated under conditions of low state input. The rotational speed of the motor may further be made subject to control by the user, and in addition such speed control may be accomplished in combination with a START command as described in connection with FIG. 2.

A manual cueing means is provided whereby the arm can be caused to lift, or to lift and swing, under the control of the user without the need for physical contact with the arm by the user. Such a cueing device 19 consists of sensor contacts 160, hereafter referred to as "lift sensor", and a means for causing a control signal of variable magnitude and polarity to be obtained in response to the position of a button or other device in conjunction with a potentiometer.

Actuation of lift sensor 160 causes a high logic state to exist, which is communicated to OR-gate 20, transmission gate 33, and muting and anti-skating subsystem 21. Transmission gate 33 is of such a nature that the application of a suitable gating signal inhibits the passage of a signal through the circuit. Such gating signal corresponds to said high state signal from lift sensor 160. Thus, when the manual lift function is activated by means of lift sensor 160, transmission of signals from position sensor 22 to the remainder of the circuit is prevented, whereby the user is enabled to move the arm at will without causing any change in the state of the control flip-flops 12 and 8 which might otherwise occur due to the action of position sensor 22. Additionally, a high signal from 19 is applied to OR-gate 20 when lift sensor 160 is activated, resulting in a high output from OR-gate 20 and activation of lift 2. A high state signal resulting from the activation of lift sensor 160 is also applied to one input of muting and anti-skating circuit 21. Such input causes the immediate cessation of audio output from the turntable and also the immediate cessation of anti-skating current applied to drive coil 125.

The signal from control 23 is applied to amplifier 4 in such a manner as to control the drive signal to coil 125 through switch 3, indicated symbolically in FIG. 1 by a summation at one input of amplifier 4. The potentiometer 23 is so connected that either positive or negative voltage may be obtained in order that the tone arm may be moved in either an inward or an outward direction; and the magnitude of such voltage may be varied by the user to control arm rotation velocity.

Figure 2:
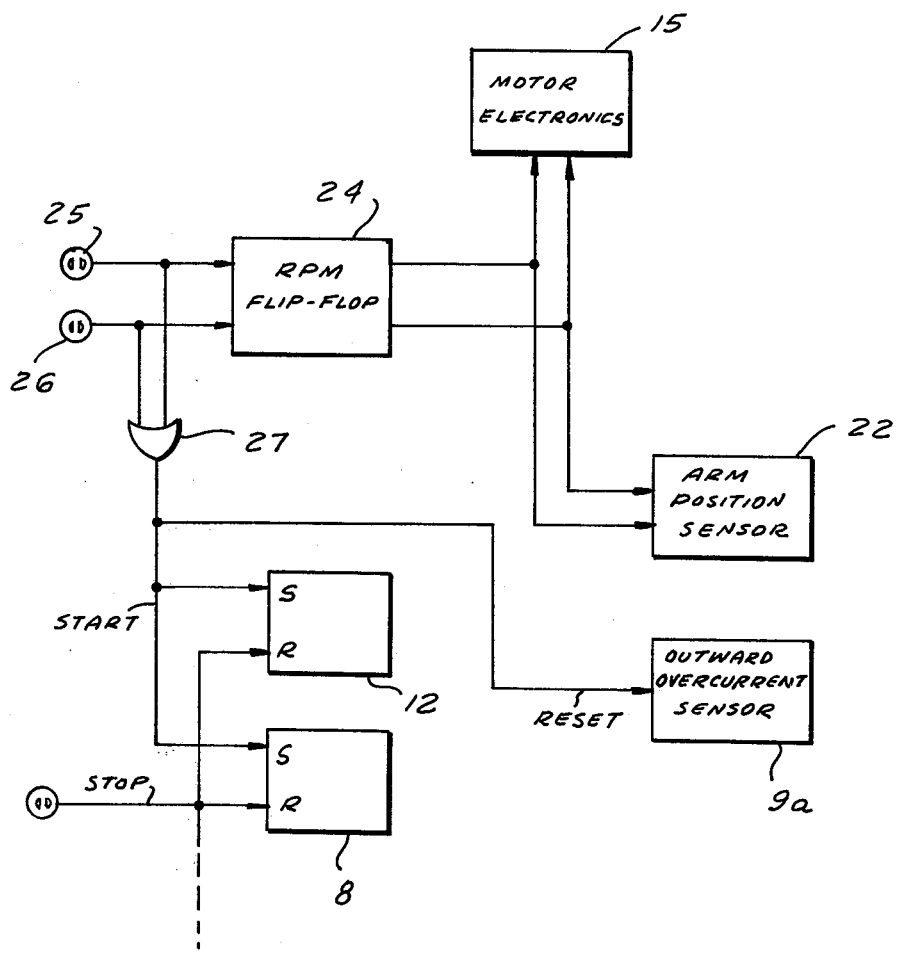
FIG. 2 is a schematic block diagram of a portion of a modified second embodiment, depicting only that part of the second embodiment which differs from the embodiment of FIG. 1.

An extension of the basic system is shown in FIG. 2. FIG. 2 represents essentially only those elements which differ from FIG. 1. In this extension, automatic fully electrical control is extended to platter rotational speed selection and integrates speed selection and START and STOP command functions. The STOP function is supplied by suitable means such as an electronic sensor, responding to skin resistance of the fingertip, or other suitable excitation, which means replaces the switch 13 in FIG. 1. Two additional densors 25 and 26 are provided, which sensors operate in a manner similar to the sensor associated with the STOP function as just described. An OR-gate with one input connected to sensor 25 and one input connected to sensor 26 supplies at its output a signal which replaces switch 14 in FIG. 1. By this means, actuating either sensor 25 or sensor 26 initiates a START command in the manner previously explained. Sensors 25 and 26 are also connected to one input and another input respectively of a bistable storage device 24. This device, which may be an electronic flip-flop circuit or other non-mechanical device, has two outputs. One output exhibits a high state when the corresponding input connected to sensor 25 is activated, and the other output exhibits a high state when sensor 26 is activated. In both cases, the logic state is retained at the output of 24 after actuation of either sensor 25 or sensor 26 has ceased. The purpose of these two outputs of flip-flop 24 is to provide information to other portions of the turntable regarding (1) desired platter speed, for instance 33⅓ or 45 rpm; and (2) an associated record diameter, such as 12 inches and 7 inches. Each output of flip-flop 24 is connected to a corresponding input of motor electronics sybsystem 15, one input causing the motor to revolve at one desired speed when the motor is energized, and the other such input causing the motor to revolve at some other desired speed when the motor is energized. The two outputs of flip-flop 24 are also connected to each of two inputs of arm position sensor 22. Said inputs are so arranged that the activation of one causes one photodetector, corresponding to a certain record diameter, to be active. Likewise, an activation of the other of the said inputs causes another photodetector corresponding to another record diameter to be active. By these means, a further improvement is offered to the user in that START and the selection of platter speed and record diameter are performed in one and the same act of the user.

The description of the several means whereby START and STOP commands may be entered into the turntable control system is not intended to exclude other possible means. In particular, means providing alternate or toggling action associated with a single knob or button or rocker or other actuator accessible to the user may be used. By this means, a first actuation would cause a START condition by setting flip-flops 12 and 8, and a second actuation would cause a STOP command to be registered by means of the resetting of both flip-flops 12 and 8. Such alternate action may be provided for example by a suitable arrangement of switching contacts simultaneously actuated by a knob or button or rocker accessible to the user, which switches connect charge storage elements to the appropriate inputs of the said flip-flops, as depicted in FIG. 3. The use of other means of obtaining alternate action is not excluded.

The swing unit 1 per se is a rotary electromagnetic device, for example such as disclosed in FIG. 12 of German published patent application No. DT-OS 21 04 692. Inasmuch as the location of the lead-in groove of a phonograph record depends upon the size of the record, use is made of a changeover switch 16 which is coupled to the rpm selector 17 of the phonograph, in order to correlate the location of the lead-in groove of the record with its rpm and accordingly its diameter.

The manual control 19 is essentially comprised of a rotary, circular, touch-responsive knob, provided with a finger depression. If the user lays his finger into the finger depression of knob 19, this results in the generation of a signal which commands that the tone arm be lifted. If the user turns the rotary knob 19, with his finger laid in the finger depression of the knob, in one rotary direction or the other, this adjusts the setting of a cooperating potentiometer 23 and makes possible manual selection of the rate at which the lifted tone arm swings, i.e., manually controlled cueing.

In the exemplary embodiment, lift unit 2 is a hot-wire device; i.e., hot-wire lift unit 2 positively lifts the tone arm or permits the tone arm to lower, depending upon whether heating current flows through the hot wire of the lift unit 2 or not. As indicated by the broken line extending from lift unit 2 to switch 3, the normally open switch 3 is closed only when the lift unit 2 is holding the tone arm in lifted position. Accordingly, unless the tone arm is in lifted position, swing unit 1 will not be energized and the tone arm will not swing in or out.

In FIG. 1, the touch-activated switches 13, 14 can be pure touch switches which include no moving parts, for example of the type where the user's finger itself completes a current path, where the body heat transmitted from the user's finger causes the touch switch to generate a signal, and the like. Alternatively, the touch-activated switches 13, 14 could be very-light-pressure momentary switches, e.g., pushbutton switches which are closed only so long as the user presses upon them; with the pressing force required to hold the switches closed being extremely low, i.e., so that a very light touch upon them causes them to become briefly closed. If very-light-pressure momentary switches are employed, then the two switches 13, 14 could, for example, be activated by means of a single very-light-pressure rocker which the user would briefly and lightly touch at one end to briefly close switch 14 and at its other end to briefly close switch 13.

FIGS. 3a to 3c together depict, in detail, a circuit diagram of an exemplary embodiment of the inventive tone-arm control system. This circuit includes the swing unit 1, the lift unit 2, and the switch 3 which connects the control amplifier 4 to the rotary electromagnetic swing unit 1, all as discussed above in connection with FIG. 1. The opening and closing of switch 3 is not performed electrically, but instead by mechanical means; i.e., the mechanical state of tone-arm lift unit 2 controls the setting of switch 3. The control amplifier 4 includes an operational amplifier 100 to whose output is connected an end amplifier stage comprised of transistors 101, 102, 103. The resistors 104-108 and capacitors 109, 110 within control amplifier 4 are biasing elements.

Flip-Flop 12 is formed from two interconnected NOR-gates 137 and 138. Its normal output is connected to one input of gate 145. A complement output is also used, connected via resistor 185 to start/stop switch 14. The normal output of flip-flop 12 is also connected via resistor 153 to switch 242. Both switches 14 and 242 are actuated simultaneously by the start/stop button. When so activated, capacitor 141 is connected to one reset input of flip-flops 8 and 12, and capacitor 197 is connected to the set inputs of flip-flops 8 and 12 and the reset input of the outward current sense 9a. In the non-actuated position, either capacitor 141 or 197 will be charged to a logic high voltage level, the other to a logic low level, depending on the state of flip-flop 12. When flip-flop 12 is set, the output is high and so capacitor 141 is charged and capacitor 197 is not. Actuating start/stop causes the voltage on capacitor 141 to be impressed on one reset input of each flip-flop 12 and 8, causing both flip-flops to assume a low or reset state, corresponding to STOP. When flip-flop 12 is low or reset, the complement output of 12 will be high, charging capacitor 197 when switch 14 is in a non-actuated position. Actuating switch 14 and 242 supplies the voltage stored in capacitor 197 to the set inputs of flip-flops 12 and 8 and the reset input of overcurrent sensor 9a. In this way, alternate action of one start/stop knob is obtained.

Flip-flop 8 is composed of cross-connected NOR-gates 139 and 140. Resistor 151 insures that flip-flop 8 will assume a desired state, namely low or reset, during powerup. The output of flip-flop 8 is connected to NOR-gate 145, resistor 146, one input of NOR-gate 18, one input of gate 157, and one input of OR-gate 20.

NOR-gates 141, 142, resistor 143, capacitor 144 constitute the delay circuit mentioned above. Gate 141 has two inputs which stand in the logical relationship of OR-gate to the output of gate 142. One input is connected to the output of position sensor subsystem 33. This corresponds to the circuit arrangement depicted in FIG. 1. Resistor 149 and capacitor 148 form an integrating network for the inward overcurrent sensor 9b. As mentioned above, the threshold may be provided by the following circuitry, which is the case here. The output of the inward current sense is shown in FIG. 1 as connected to one reset input of flip-flop 8. A logically equivalent connection is to make such a connection via an OR function, which as just described is provided by gate 141 in combination with gate 142. This eliminates the requirement for a fourth input in gate 140, which would otherwise exist.

The outward overcurrent sense 9a is provided by a threshold detector consisting of transistor 128 and resistors 132, 133, 131 and 129; an integrator consisting of resistor 130 and capacitor 134; and a storage device comprised of NOR-gates 135 and 136 cross-connected as a flip-flop. Transistor 128 is biased by its associated resistors 129, 132, 133 into conduction. When the input applied to 9a via resistor 131 exceeds a predetermined negative voltage, transistor 128 ceases to conduct and the resulting positive voltage existing at the collector of transistor 128 is applied via the aforementioned integrator to the aforementioned flip-flop. When the output of the integrator is sufficient, the flip-flop will assume a set state. This constitutes detection of an overcurrent condition in the outward-going mode. Reset of current sense 9a is provided via one input to gate 135. Resistor 248 insures that this flip-flop assumes the desired set state following power-up.

Initialization of logic states following power-up is here accomplished by resistors, since the CMOS logic elements used in the described embodiment of the invention exhibit a high-impedance state a low supply voltage. Should other forms of logic elements be used to embody the invention, it is understood that other forms of initialization may be necessary or desirable.

The OR-gate 20 is composed of resistors 164, 165, 166. The output of OR-gate 20 is the point at which one terminal of each of said resistors join and this output is connected to a lift driver circuit composed of transistors 163 and 169 together with associated biasing resistors 167, 168.

The muting and anti-skating subsystem 21 has three major subdivisions. The first is a time delay means 21a, which provides a small time delay for signals increasing from zero, but which provides significant time delay of a desired amount for signals decreasing from a high state level to zero. The purpose is to provide, in conjunction with the remainder of sybsystem 21, a means for providing delayed switch-on of audio signal transmission means and anti-skating compensation means as discussed above. Such a delay 21a is provided by diode 170, capacitor 112, and resistors 113 and 171.

The circuit 21 briefly mentioned with respect to FIG. 1 is here shown subdivided into three stages: a time-delay stage 21a; an audio switch-on stage 21b; and an anti-skating stage 21c. Time-delay stage 21a comprises a capacitor 112, a resistor 113, a diode 170 and a resistor 171.

The output of time-delay stage 21a is connected, via an OR-gate comprising gates 111 and 114, to the audio muting sybsystem 21b. Muting system 21b comprises a switching transistor 116, a relay winding 117, a capacitor 118, a resistor 119 and a diode 120. The emitter of transistor 116 is connected to ground, whereas its base is connected to resistors 115, 119 and to capacitor 118. The collector of transistor 116 is connected to relay winding 117, to the right electrode of capacitor 118 and to the cathode of diode 120. The audio switch controlled by muting 21b is per se denoted by numeral 30, and is a double-pole relay switch controlled by relay winding 117. Switch 30, when closed, connects the sound pick-up system 31 of the phonograph to the connector 32 for the audio amplifier of the phonograph.

An anti-skating compensation current is provided by a current source consisting of transistor 121 and resistors 122 and 123. The magnitude of current provided by such a current source is determined by the voltage applied to the base of transistor 121. This base voltage can be adjusted by the user by means of a knob connected to potentiometer 245. Potentiometer 245 is supplied with voltage from the aforementioned relay switch circuit 21b via resistor 246. Consequently, the current source 21c is active only under the condition that the relay coil 117, corresponding to allowed transmission of audio signals, is energized.

If the tone arm is swung outward and impacts against an obstacle, e.g., an end stop, there flows through drive winding 125 an elevated current, also present at the output of control amplifier 4, and this elevated current is detected by current sensor 9a. In particular the base threshold current of transistor 128 within current sensor 9a is exceeded, and transistor 128 changes its condition state. The resistors 129, 130, 131, 132, 133 and the capacitor 134 serve to bias transistor 128 and to establish a suitable threshold level for the transistor.

The overcurrent sensor 9a for outward swing also includes a flip-flop comprised of two cross-coupled NOR-gates 135, 136.

The second input of NOR-gate 141 is connected to one input of the NOR-gate 18, the output of which is connected to platter-motor flip-flop 12. Resistors 150, 151, 152, 153, 154 merely serve to properly bias the logic elements. NOR-gate 18 has one of its inputs connected to the output of a photodetector logic circuit 33, which latter comprises three NOR-gates 155, 156, 157, a diode 158 and a capacitor 159. The upper input of NOR-gate 156 is connected to the output of a photodetector unit 34 and to the upper terminal of a resistor 161 whose lower terminal is connected to ground. The left input of NOR-gate 157 is connected to a touch-responsive element 160 of the manual control 19. When touch-responsive element 160 is touched by the finger of the user, this commands lifting of the tone arm. The manual control 19 furthermore includes the already discussed potentiometer 23. Additionally, the left input of gate 157 is connected to ground via a capacitor 162.

Transmission gate 33 is composed of two NOR-gates 155 and 156. The signal input is the upper input of gate 156 and the signal output is the output of gate 155. The gating input is the lower input of gate 156. A high logic level at such gating input interrupts signal transmission from signal input to signal output.

Gate 157 in conjunction with sensor 160 provides a high level output when sensor 160 is activated. Diode 158 and capacitor 159 constitute a peak-hold circuit used as a noise removal filter to ensure proper operation of the lift function when a finger is applied to sensor 160. The output of this noise filter is connected to the aforementioned lower input of gate 156, and is also connected to one input of OR-gate 20. The connection shown for the right-hand input of gate 157 is not necessary for the proper operation of this circuit. The connection existing between the output of gate 156 and one input of gate 111 provides activation of audio muting and cessation of anit-skating compensation by circuits 21b and 21c when the manual lift sensor 160 is activated.

A signal commanding that the tone arm be lifted can be furnished from the cathode of the diode 158 in the photodetector logic circuit 33 to the OR-gate 20. OR-gate 20 comprises a transistor 163 and four resistors 164, 165, 166, 167. A command signal for tone-arm lift can also be received by OR-gate 20 from the output of NOR-gate 145 or from the output of swing-in flip-flop 8.

Connected to the output of OR-gate 20 is a lift switch 35 comprised of a resistor 168 and a transistor 169. The collecter of transistor 169 is connected, via a diode 170 and a resistor 171, to the aforementioned time-delay stage 21a.

The photodetector unit 34 includes a light shield 172 mechanically coupled to the tone-arm of the phonograph. Light shield 172 is guided for movement between a light source 173 and two photodetectors 174, 175. The two photodetectors are located behind respective ones of two apertures in a light screen 176. The two photodetectors 174, 175 are so located that the light shield 172 coupled to the phonograph tone arm unblocks one photodetector when the tone arm has been swung to a location corresponding to that of the lead-in groove of, for example, a 33 rpm record, and unblocks the other photodetector when the tone arm has been swung to a location corresponding, for example, to the lead-in groove of a 45 rpm record. The photodetectors 174, 175 are here phototransistors. The switches 16, 17 are selector switches for selecting different turntable speeds, e.g., the right switch 16, 17a being for 33 rpm and the left switch 16, 17a for 45 rpm. The switches 16, 17 are accordingly two-position switches, in the exemplary embodiment.

The start and stop switches 13, 14 of FIG. 1 are likewise shown in FIG. 3. These are used to start and stop the platter motor 176. Stopping of the platter motor 176 is effected through the intermediary of a motor stop switch 36.

FIG. 3 also depicts the internal circuitry of the platter-motor control electronics 15, e.g., including an integrated regulating block 177, resistors 178–186 and 190, potentiometers 187, 188, 189 and capacitors 191–199, all serving to regulate motor speed. Preferably, motor speed is regulated in conventional manner using pulse-width modulation, this being mainly performed by the integrated-circuit regulating block 177.

The control system furthermore includes a conventional power-supply unit 37, comprising a transformer 202 and two rectifiers 203, 204, which can be connected via a switch 205 to a wall outlet connector 206. The capacitors 207–215 and the fuse 216 perform conventional functions, and need not be discussed in detail here.

The platter or structure carrying and turning with the platter is advantageously provided with a flat, annular or disk-like magnetizable surface provided with equiangularly spaced magnetized portions. During platter rotation, the magnetized synchronizing portions are sensed by an inductive sensor 38, which latter generates an rpm feedback signal which is applied to the platter-motor control electronics 15.

Two light-emitting diodes 250, 251 serve to indicate whether the phonograph is set for operation at 33 rpm or 45 rpm. To apply voltage to these LED's 250, 251, these are connected in the current paths of a switch 16, 17c which is coupled to the rpm selector switch 16, 17a.

Figure 4B:
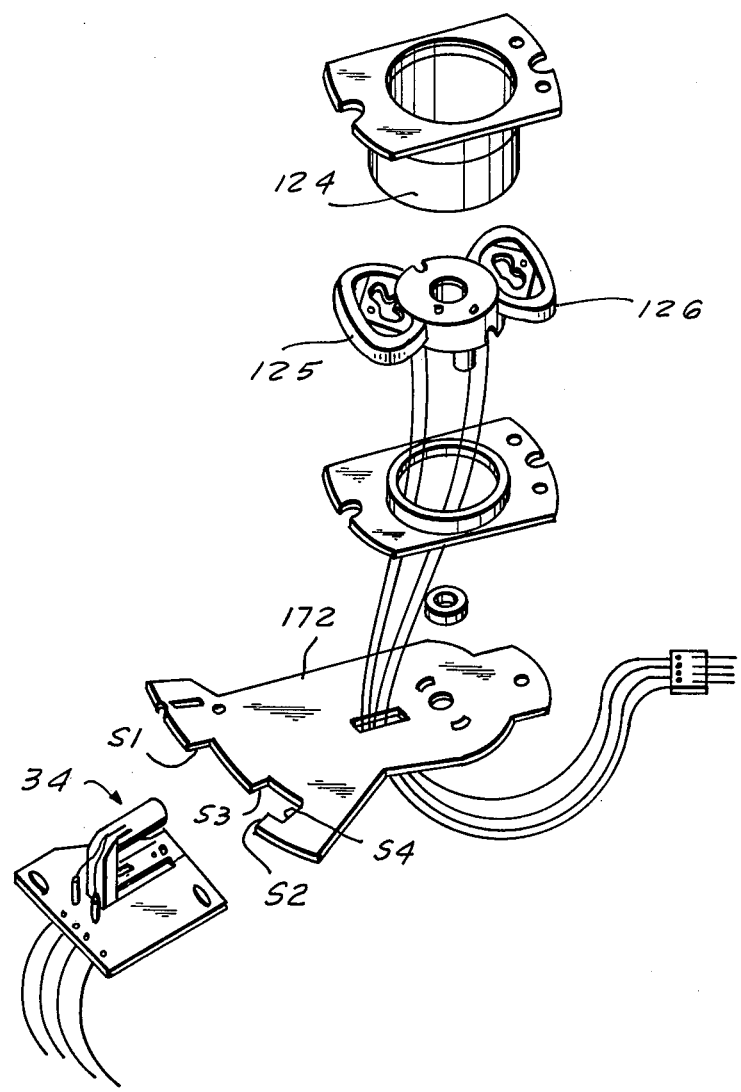

FIGS. 4a and 4b depict certain mechanical details of the swing unit 1 and the lift unit 2. The tone-arm mounting shaft is denoted by TS and is turned by the swing unit 1. The swing unit 1 includes two stator windings 125, 126 which, as best seen in FIG. 4b, are of 90° sector configuration, as well as a rotor magnet 124, a lower flux-return ring of ferromagnetic material FR, and an upper flux-return ring at the top of the annular rotor magnet 124. Also shown in FIG. 4a is the hot wire HW of the lift unit 2 and the lift-unit-controlled switch 3, discussed earlier with respect to FIG. 1. Mounted on the tone-arm mounting shaft TS is the aforementioned light shield 172. Light shield 172 swings through the light detector unit 34, between the light source 173 and the phototransistors 174, 175 thereof. The light detector unit 34 includes the aforementioned apertured light screen 176, behind the apertures of which the two phototransistors 174, 175 are located. The two phototransistors 174, 175 are located at different respective radial distances from the axis of the tone-arm mounting shaft TS.

As best seen in FIG. 4b, the light shield 172 is provided with two apertures, of different respective radial spacing from the axis of the tone-arm mounting shaft. The radially outer aperture, whose ends are denoted by S1, S2, has a tangential angular span corresponding to the radial length of the modulated zone of, for example, a 33 rpm phonograph record. The radially inner aperture, whose ends are denoted by S3, S4, has a tangential angular span corresponding to the radial length of the modulated zone of, for example, a 45 rpm phonograph record.

When the tone arm is swung inward, the light shield 172 coupled thereto turns clockwise (as viewed in FIG. 4b). During the inward swing, first the aperture edge S1 moves into the region of the phototransistors in detector unit 34; aperture edge S1 corresponds to the lead-in groove of, for example, a 33 rpm record. Next, aperture edge S3 moves into the phototransistor region; edge S3 corresponds to the lead-in groove of, for example, a 45 rpm record. Next, aperture edge S2 moves into the phototransistor region; aperture edge S2 corresponds to the end groove of, for example, a 33 rpm record. Finally, aperture edge S4 moves into the phototransistor region; edge S4 corresponds to the end groove of, for example, a 45 rpm record.

Returning to FIG. 1, the flip-flops 8, 12 and 24 can be, as shown in FIG. 3, electronic flip-flops of the type comprised of cross-coupled logic elements, cross-coupled amplifier elements, or the like, and this is preferred. However, in general, the devices 8, 12 and 24 could be electrical storage devices of other non-mechanical types, e.g., magnetic storage cells, and the like. Also, whereas bistable (i.e., two-state) storage devices are herein disclosed for storage devices 8, 12 and 24, other storage devices having equivalent storage states, and thus capable of performing functionally equivalent command-signal storage, could also be used.

It will be understood that each of the elements described above, or two or more together, may also find a useful application in other types of circuits and constructions differing from the types described above.

While the invention has been illustrated and described as embodied in a two-speed phonograph turntable control system, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an automatic turntable control system for phonographs, of the type including lifting means for lifting and lowering the tone arm of the turntable, swinging means for swinging the tone arm of the turntable inward and outward, and a platter motor for rotating the platter of the turntable, in combination therewith, a platter-motor storage having a motor-operate set state and a motor-not-operate reset state; means connected to the platter motor and to the platter-motor storage and operative for causing the platter motor to operate or not operate in dependence upon the state of the platter-motor storage; a second storage having set and reset states; touch-activated start-stop switch means operative when touched by the user to start the turntable for setting the platter-motor storage and the second storage and operative when touched by the user to stop the turntable for resetting the platter-motor storage and the second storage; logic-circuit means connecting the outputs of the storages to the swing unit and to the lift unit for applying activating signals to those units in dependence upon the combination of states assumed by the platter-motor storage and the second storage; switch means for transmitting activating signals from the logic-circuit means to the swing unit; switch-circuit means operative for rendering the switch means conductive when the lift means has lifted the tone arm; sensor means operative for sensing the reaching of predetermined operating points in the operation of the turntable and altering the states of the storages in dependence thereon; and a touch-activated lift-tone-arm switch operative when touched by the user for transmitting an activating signal to the lift means and also altering the state of at least one of the storages.

* * * * *